United States Patent [19]
Raehse et al.

[11] Patent Number: 5,519,948
[45] Date of Patent: May 28, 1996

[54] PROCESS FOR THE PRODUCTION OF GRANULES SUITABLE AS WETTING AGENTS, DETERGENTS AND/OR CLEANING PRODUCTS

[75] Inventors: Wilfried Raehse, Duesseldorf; Johann Fues, Grevenbroich; Wilhelm Beck, Duesseldorf; Otto Koch, Leichlingen, all of Germany

[73] Assignee: Henkel Corporation, Plymouth Meeting, Pa.

[21] Appl. No.: 284,613

[22] PCT Filed: Feb. 4, 1993

[86] PCT No.: PCT/EP93/00266

§ 371 Date: Oct. 26, 1994

§ 102(e) Date: Oct. 26, 1994

[87] PCT Pub. No.: WO93/15813

PCT Pub. Date: Aug. 19, 1993

[30] Foreign Application Priority Data

| Feb. 12, 1992 | [DE] | Germany | 42 04 090.6 |
| Feb. 12, 1992 | [DE] | Germany | 42 04 035.3 |
| Feb. 27, 1992 | [DE] | Germany | 42 06 050.8 |
| Mar. 2, 1992 | [DE] | Germany | 42 06 521.6 |

[51] Int. Cl.⁶ ............................................. F26B 3/00
[52] U.S. Cl. .................... 34/347; 34/353; 34/370; 34/372; 34/423; 34/424; 34/426; 34/480; 34/69; 34/71; 34/513
[58] Field of Search ................ 34/345, 347, 352, 34/353, 370, 371, 372, 375, 378, 423, 424, 426, 469, 480, 502, 507, 509, 513, 69, 71

[56] References Cited

U.S. PATENT DOCUMENTS

| 1,787,402 | 12/1930 | Stoddard et al. | 34/352 |
| 2,843,942 | 7/1958 | Whitsel | 34/370 |
| 3,212,197 | 10/1965 | Crawford | 34/371 |
| 3,238,634 | 3/1966 | Goins | 34/371 |
| 4,052,794 | 10/1977 | Ganiaris | 34/371 |
| 5,016,361 | 5/1991 | Durr | 34/370 |

FOREIGN PATENT DOCUMENTS

| 0163836 | 12/1985 | European Pat. Off. . |
| 2412837 | 10/1974 | Germany . |
| 4030688 | 4/1992 | Germany . |
| 61-004795 | 1/1986 | Japan . |
| 8805373 | 7/1988 | WIPO . |

OTHER PUBLICATIONS

Uhlmann, Chem. Ing.–Tech. 62 (1990), Nr. 10, Seiten 822–834.
Gehrmann, Chem.–Ing.–Tech. 62 (1990), Nr. 10, Seiten 512–520.
A. M. Trommelen et al., "Evaporation and Drying of Drops in Superheated Vapors" AICHE, Journal 16 (1970), Seiten 857–867.
Colin Beeby et al. "Stam Drying", Plenary Lecture, Proc. 4th, Int. Drying Sym. Kyoto (eds. R. Toei und Arun S. Mujamdar), 1984, Bd. 1, Seiten 51–68.
W. A. Stein, "Berechnung der Verdampfung von Flüssigkeit aus feuchten Produkten im Sprühturm", Verfahrenstechnik 7 (1973), Seiten 262–267.

*Primary Examiner*—F. Daniel Lopez
*Attorney, Agent, or Firm*—Ernest G. Szoke; Wayne C. Jaeschke; Real J. Grandmaison

[57] ABSTRACT

A process for the production of pourable, free-flowing granules which are suitable for use as wetting agents, detergents or cleaning products from aqueous solutions or suspensions of such materials in a fluidized-bed spray granulation apparatus employing a hot fluidizing gas. The aqueous selections or suspensions are dried with superheated steam as the fluidizing and drying gas wherein the drying step is carried out in a closed-loop system comprising a steam circuit from which the water evaporated from the aqueous solutions or suspensions of starting materials is removed as a partial stream and the thermal energy released is returned to the steam circuit. The granules are discharged from the granulation apparatus before they can be damaged by heat.

27 Claims, 1 Drawing Sheet

PROCESS FOR THE PRODUCTION OF GRANULES SUITABLE AS WETTING AGENTS, DETERGENTS AND/OR CLEANING PRODUCTS

BACKGROUND OF THE INVENTION

This invention relates to a process for the production of pourable free-flowing granules of useful materials or mixtures thereof, which are suitable as and/or for use in wetting agents, detergents and/or cleaning products, from aqueous solutions and/or suspensions of such materials by fluidized-bed spray granulation in a hot fluidizing gas in the region of normal pressure.

Processes for the production of particles on an industrial scale from initially liquid products, i.e. from solutions or suspensions, include in particular spray drying, spray drying with integrated fluidized-bed agglomeration and fluidized-bed spray granulation. For decades now, spray drying has been typically used worldwide for the industrial-scale production of granules from aqueous preparations of useful materials of the type mentioned at the beginning. Hot air or mixtures of air and hot waste combustion gases are used as the drying gas stream. Washing powders and useful materials and mixtures thereof for the production of laundry detergents in pourable free-flowing powder form are industrially obtained in so-called spray-drying towers generally operated at ambient pressure either in countercurrent or, occasionally, in co-current.

DISCUSSION OF RELATED ART

The use of fluidized-bed spray granulation for the production of detergent granules is also known from the prior art (Uhlemann in Chem.-Ing.-Tech. 62 (1990), No. 10, pages 822–834 and EP-B-163 836). In this process, which is carried out far more rarely for the production of powder-form wetting agents, detergents and cleaning products, solid particles are kept suspended in an upwardly directed gas stream. In this state, the particles are separated from one another and are thus universally accessible to the droplets formed when liquid is sprayed into the fluidized bed. In addition, intensive heat exchange and mass transfer between the solid particles and the gas stream take place in this state.

Now, when a sprayed droplet meets a suspended particle, the liquid product of the sprayed droplet spreads over the solid substrate. The intensive heat exchange and mass transfer with the surrounding gas stream results in drying and solidification of the liquid film. As a result of repeated spraying, spreading and solidification, the particle grows like an onion. The particle with the required particle size is compact and also substantially round.

In the fluidized-bed spray granulation of aqueous preparations of the substances mentioned at the beginning, hot air is used as the fluidizing gas in the same way as in spray drying. In addition, the use of nitrogen gas is mentioned in EP-B-163 836.

In addition to the discretionary availability of the gas phase, advantages of drying using hot air as the drying gas include inter alia the possibility of working in so-called open systems which enable the moisture-laden hot gas phase to be disposed of without difficulty by discharge into the outside atmosphere. In addition, intensive physicochemical investigations into the course followed by the drying process have shown that drying with hot air takes place effectively and quickly, even where comparatively mild hot gas temperatures are used. The drying process on the moist particle actually begins at comparatively low temperatures, for example at particle temperatures of around 40° C., largely irrespective of the temperature of the hot gas used and continues with a comparatively slow increase in the particle temperature to the boiling range of water under normal pressure. Overall, the drying process in hot air takes place quickly and very effectively, even in the final stages, so that the useful materials are exposed to comparatively mild temperatures during drying to form the free-flowing particles.

Among the disadvantages and limitations of this type of process for the specialist field targeted by the invention of the drying of useful materials or mixtures thereof in the production of laundry detergents and/or cleaning products, the following points are mentioned by way of example. Many of these useful materials are sensitive to oxidation, particularly in the case of organic components. The treatment with hot air can lead to damage, particularly at relatively high temperatures. The drying of organic or substantially organic useful materials, for example surfactants based on natural materials, presents considerable problems through the risk of fire or even explosion of the material being dried. Important useful material components, more particularly detergent-range nonionic surfactants, show a more or less pronounced tendency towards pluming, i.e. the transfer of organic aerosols to the steam-laden waste air of the spray-drying towers. Overall, there is an increased danger of environmental pollution from the large quantities of aqueous, solid and gaseous materials and auxiliaries involved in the process. Thoughts of recirculating the drying gas stream have never materialized successfully in the industrial application of this process.

It is also known that superheated steam can be used instead of hot air as the drying gas in fluidized-bed drying (Gehrmann, Chem.-Ing.-Tech. 62 (1990), No. 10, pages A 5512–A 520). Particularly low emissions (wastewater, waste air) are achieved in this case through condensation of the vapors driven out. According to the prior art, however, this process can only be used for relatively heat-resistant products, such as for example lignite or treated sewage. The drying of paper pulp is mentioned as another application. The same document refers to the use of vacuum dryers to reduce emissions in the drying of temperature-sensitive products, but at the same time refers to the difficulties involved in the continuous operation of such dryers with free-flowing bulk materials.

Problems are also encountered in the drying of temperature-sensitive products in steam fluidized-bed dryers. This is because the drying rate at temperatures around 150° C. is distinctly lower for superheated steam than for hot air. The drying rates can only be increased by raising the operating temperature to 250° C. Accordingly, where superheated steam is used as the drying gas, useful materials of the type mentioned at the beginning can only be dried to typical residual moisture contents in acceptable drying times at high operating temperatures at which unacceptable damage to the material being dried occurs.

Accordingly, the problem addressed by the present invention was to improve the process mentioned at the beginning so that it could be carried out free from waste gases and free from polluted wastewater without any deterioration in the quality of the granules obtained where the process is carried out on an industrial scale.

DESCRIPTION OF THE INVENTION

According to the invention, the solution to this problem is characterized in that superheated steam is used as the fluidizing gas, the granules are discharged from the granulator before they can be damaged by heat and the long-term pourability and flowability of the material thus dried is optionally established by addition of mixture constituents capable of binding limited quantities of water and/or by an aftertreatment and in that the process is carried out in a closed-loop system comprising a steam circuit from which the water evaporated from the starting material is removed as a partial stream and the thermal energy released is returned. Energy can be supplied outside the drying vessel by superheating the steam and/or inside the drying vessel via integrated heat exchangers.

Earlier patent application DB-A 40 30 688 describes a process for obtaining fine-particle, solid, pourable or flowable useful materials or mixtures thereof for wetting agents, detergents and/or cleaning products from aqueous preparations of the materials, in which superheated steam is used as the drying hot gas stream and drying of the particulate material is terminated before it is damaged by heat. If necessary, the long-term pourability or flowability of the material thus partly dried is established by addition of mixture constituents which are capable of binding limited quantities of water. In addition to or instead of this measure, the particulate material may also be aftertreated to homogenize its residual moisture content and/or subsequently dried under moderate conditions.

However, spray drying is used for the production of granules in this earlier application. Fluidized-bed drying is merely mentioned as an option for the aftertreatment of the dried material.

The present invention, which is described hereinafter, relates to a specific embodiment of the process according to the earlier application cited above. In the interests of full and complete disclosure of the invention, the disclosure of this earlier application is specifically included in the disclosure of the present invention.

It is important in this connection to bear in mind the fact that practical experience in the application of drying processes using superheated steam as the drying gas has been very limited up till now although, basically, this technology has been known since the beginning of this century and has been repeatedly described in the literature. Earlier application DE-A 40 30 688 deals in detail with the relevant prior-art literature. Reference is made here to the corresponding observations in the earlier application and solely to the following publications which in turn cite numerous publications on this subject: Trommelen et al. "Evaporation and Drying of Drops in Super-heated Vapors" AIChE Journal 16 (1970) 857–867; Colin Beeby et al. "STEAM DRYING" Plenary Lecture, Proc. 4th Int. Drying Sym. Kyoto (eds. R. Toei and Arun S. Mujumdar) 1984, vol. 1, 51–68 and W. A. Stein "Berechnung der Verdampfung yon Fl üssigkeit aus feuchten Produkten im Sprühturm (Calculating the Evaporation of Liquid from Moist Products in Spray Drying Towers)", Verfahrenstechnik 7 (1973), There is a fundamental difference between drying with hot air and drying with superheated steam which is crucial to the understanding of the invention: where hot air is used, the drying process begins effectively at relatively low material temperatures. The removal of water is so pronounced that drying is almost complete on reaching a material temperature of around 100° C. For example, up to about 90% of the total water present has already been removed from the droplet by this time. The temperature profile of the droplet is completely different where superheated steam is used. By condensation of the super-heated steam on the cooler starting material and release of the heat of condensation to the material to be dried, the aqueous drop is spontaneously heated to the boiling temperature of the water under the operating conditions, i.e. to temperatures of around 100° C. where drying is carried out under normal pressure. This boiling temperature is maintained as a minimum temperature in the drop of material throughout the entire drying process. The particular level of charging of the aqueous phase with the dry materials to be obtained leads to individual upward deviations of the temperature profile at an earlier or later stage, depending on the degree of drying of the drop.

In the process according to the invention, in which certain limitations regarding the result of drying in the end product are intentionally accepted, use is made of the various advantages of replacing hot air by superheated steam in fluidized-bed spray granulation precisely in the case of the temperature-sensitive material with which the invention is concerned. According to the invention, a crucial element in this regard is the acceptance in the dried material of residual moisture contents which can be quite considerable, depending on the particular case, and at the same time the establishment of the long-term pourability and flowability of the granular material thus dried either by optional auxiliaries and/or by an aftertreatment, for example after-drying. The auxiliaries used may in turn be selected useful materials for the application envisaged or inert materials, as will be explained hereinafter. According to the invention, it is thus possible to maintain the quality standards of the well known complex requirements which the multicomponent mixtures based on organic and inorganic components, for example laundry detergents, with which the invention is concerned, are expected to satisfy without any reduction in quality and without losing any of the advantages of drying with superheated steam. Oxidation processes involving vulnerable components of the wetting agents, detergents and cleaning preparations are suppressed; dangers of fire and explosions are eliminated. Since the drying steam is circulated, no unwanted components are discharged into the surrounding atmosphere. Only the vapors formed from the material to be dried have to be removed from the circuit and cleaned. Any fractions of material removed in the process are utilised. Other technological advantages regarding the design of the corresponding apparatus can also be utilized.

The energy introduced into the steam circuit outside the fluidized bed may be introduced in any known form, although indirect heat transfer is preferred. The use of tube-bundle systems, through which heating gases of any origin on the one hand and—separately therefrom—the steam to be heated on the other hand flow, is mentioned as an example.

In one particularly important embodiment of the invention, this indirect introduction of energy into the steam circuit is carried out by one or more integrated burners with indirect transfer of heat to the steam, the hot combustion gases being directly introduced into the heat exchanger—integrated in the steam circuit—on the burner side. The temperature of the combustion gases may be, for example, in the range from about 400° to 1000° C. and, more particularly, is in the range from about 650° to 960° C. In the interests of optimal heat utilization and hence to reduce the costs of the process as a whole, it can be useful if the waste gases are also partly and, preferably, substantially completely circulated. For example, at least 30% by volume and preferably more than 40% by volume of the hot waste gases can be recirculated after leaving the integrated heat exchanger for the further utilization of energy. The quantity of waste gases recirculated preferably amounts to more than 60% by volume and often to around 70% by volume of the combustion gases introduced. The burner may be operated with any of the usual fuel gases, more particularly natural gas or comparable lower hydrocarbons or hydrocarbon mixtures and/or hydrogen.

In the process according to the invention, thermal energy is mainly supplied to the superheated steam through internal or external heat exchangers, the superheated steam serving as transfer medium. The reliable and total absence of pollutants, particularly oxygen and carbon dioxide, in the drying gas ensures that the material to be dried does not undergo unwanted oxidation and also rules out the formation of carbonate salts or carbonate deposits that are unavoidable in the mostly basic useful materials with which the invention is concerned where drying gases containing waste gas are used. The use of heat exchangers integrated in the fluidized bed for additional heating provides for the particularly effective transfer of heat and for a considerably lower steam temperature than heating solely by introduction of superheated steam to obtain the same residual moisture content so that thermal stressing of the material to be dried is minimal. This variant of the process is particularly suitable for drying materials of medium temperature sensitivity. In the drying of thermally more sensitive useful materials and mixtures thereof, it is of greater advantage to use only external heat exchangers with shorter residence times than in the case of heat exchangers integrated in the fluidized bed.

The process according to the invention is carried out in a closed-loop system with a steam circuit from which the water evaporated from the starting material is removed while the energy released in particular in the drying step is returned to the circuit. In one important embodiment, the steam removed is first freed from entrained fractions of the starting material and put to another use as process steam, if desired after its temperature and pressure have been adapted to the conditions prevailing there. In another embodiment of the process according to the invention, it is useful to condense at least part of the steam removed. The aqueous liquid phase accumulating together with the fractions of the useful material present therein (having been removed from the circuit) is used, preferably after concentration, for the preparation of the aqueous solutions and/or suspensions to be dried.

In another preferred embodiment, the process is carried out with internal pressures of the steam-filled system in the region of normal pressure. In this embodiment, however, such elevated pressures are established in the circuit that air can be reliably prevented from penetrating the steam-filled circuit, for example in damaged areas which can never be completely ruled out in industrial installations.

Working in the region of normal pressure enables the process to be carried out relatively free from complications, even in industrial plants, with the necessary high throughputs per unit of time. Since foreign gas, particularly air, is unable to penetrate into the steam-filled circulation system, secondary damage to the high product quality required is reliably avoided. Suitable working pressures are, for example, in the range up to about 150 mbar, preferably up to about 75 mbar and, more preferably, below 50 mbar excess pressure. The range from about 5 to 15 mbar excess pressure can be of particular advantage. Drying with superheated steam in accordance with the invention is of course also possible in principle at reduced pressures, particularly moderate reduced pressures, although in this case increased outlay on equipment is necessary for ensuring the absence of possible damaged areas in the circulation system which could initiate the unwanted penetration of air.

The fact that optimal drying results by the effect of superheated steam on the end process product are not necessary is a crucial aspect of the teaching according to the invention. Residual moisture contents, even of a significant level, can be tolerated providing the composition of the material ensures that the residual water is bound so extensively by a form of "internal drying" that the long-term pourability and free flow of the dry material is guaranteed.

If the temperature sensitivity of the useful material or mixture of useful materials to be dried means that considerable quantities of water have to remain in the product subjected to the main drying process, so that this residual water may have to be bound to ensure the long-term pourability and free flow of the dried material, auxiliaries capable of fixing water, preferably in the form of particulate solids, are used in accordance with the invention. In this case, residual water may be fixed, for example, by binding as water of crystallization. However, limited quantities of water in solid particles of the type in question here can also be bound purely by absorption without causing any unwanted tackiness or adhesion of the particles to one another. The auxiliaries are at least used in quantities sufficient to guarantee pourability and stability in storage despite the residual moisture present in the material.

In one embodiment of the invention, the auxiliaries used to bind the residual water may be added to the dried fresh material, best immediately after it has left the granulator, and intensively mixed therewith. In a preferred embodiment, however, the auxiliaries are at least partly added to the aqueous solutions or suspensions before spray granulation in the fluidized bed. This particular embodiment may always be applied when the particular temperature sensitivity of the material to be dried allows drying to be carried out to such an extent that the residual moisture remaining in the product can be adequately absorbed and bound by the auxiliaries used.

In one embodiment of the process according to the invention of particular advantage in this regard, corresponding useful materials from the field of wetting agents, detergents and/or cleaning products which themselves are sufficiently immune to temperature are used as the auxiliaries capable of binding residual water. Typical examples of such materials are inorganic materials capable of binding water of crystallization from the classes of builder components, washing alkalis and/or so-called fillers, for example silicate compounds capable of binding water of crystallization, more particularly zeolites. One example particularly characteristic of laundry detergents is detergent-quality zeolite NaA which has a calcium binding power of 100 to 200 mg CaO/g (cf. DZ 24 12 837). Examples of washing alkalis which bind water of crystallization are soda or sodium bicarbonate while sodium sulfate as neutral salt or fillers are capable of binding considerable quantities of water of crystallization. However, in addition to or instead of the above-mentioned auxiliaries capable of binding water of crystallization, the residual water may also be bound by auxiliaries or corresponding useful materials capable of binding water by absorption. Thus, it is known that known starch- or cellulose-based redeposition inhibitors, fabric softeners, particularly those based on inorganic swellable silicates, and also a number of organic surfactant compounds which are solid under normal conditions are capable of absorbing considerable quantities of water without reacting by developing unwanted surface tackiness.

Depending on the temperature sensitivity of the useful materials or mixtures of useful materials used on the one hand and the nature and quantity of the auxiliaries used on the other hand, considerable residual water contents may remain in the dried material without endangering its long-term pourability and free flow. According to the invention, therefore, drying with superheated steam is terminated at residual water contents of the materials removed from the fluidized bed in the range from about 1 to 20% by weight, residual water contents in the range from about 5 to 15% by weight being preferred. The ranges mentioned relate to the weight of the material discharged from the fluidized bed. In another preferred embodiment of the invention, the amount of residual water which is not bound as water of crystallization is limited to at most about 10% by weight and preferably to no more than about 3 to 4% by weight. The foregoing observations on the percentages by weight apply in this case, too.

The working conditions of the process according to the invention enable high temperatures of the circulated steam phase to be applied in fluidized-bed drying. If the heat is introduced slowly via the steam phase, working temperatures in the range from about 270° to 350° C. in the steam phase are particularly suitable. These temperature values apply to the temperature of the optimally heated steam delivered to the fluidized bed.

Where a heat exchanger integrated into the fluidized bed is used, the heat is largely introduced through this heat exchanger. The steam phase is used for fluidization. In this case, the preferred steam entry temperatures are considerably lower, i.e. in the range from 150° to 180° C. The lower drying rate is equalized through the greater length and/or height of the bed and hence through the longer residence time in the drying zone. Accordingly, one of the two embodiments is more advantageous, depending on the temperature sensitivity of the material to be dried.

Considerations based largely on energy factors, including the intended subsequent use of the steam to be removed from the circuit, determine the quantitative ratios between the quantity of water to be evaporated and the quantity of superheated steam delivered. Embodiments which provide only for a limited reduction in the steam temperature after leaving the fluidized bed are possible in this regard whereas, in other embodiments, the thermal energy of the steam can be further utilized to reduce the temperature of the steam to the vicinity of the condensation temperature. It is also possible, as known per se, to divide the fluidized bed into various zones: high-temperature and medium-temperature zones and also a cooling zone.

In one particularly interesting embodiment of the invention, the heat of condensation of the steam removed from the circuit is recovered and utilized. By adopting suitable measures, it is even possible to recycle the small amounts of useful material which have left the primary steam circuit via the superheated steam removed therefrom. To this end, the following procedure, for example, may be adopted using the heat of condensation of the steam removed from the circuit:

Using the heat of condensation of the steam removed from the circuit, the steam condensate is concentrated in a preferably multiple-stage evaporation unit. The residual concentrate accumulating is returned to the primary process circuit. More particularly, this residual concentrate may be added to the slurry of useful material to be dried by superheated steam.

If necessary, a residual gas phase charged with minimal quantities of useful material, which may possibly accumulate during condensation of the superheated steam removed from the primary circuit, may be subsequently worked up, for example by incineration or by treatment in biofilters or in washing units. By this combination of substantially complete recycling of the particular streams and the reliable destruction of final residual traces, the process according to the invention makes it possible for the first time in the industrial field with which the invention is concerned to recover useful materials and mixtures of useful materials from the field of detergents and cleaning products free from waste air and free from polluted wastewater.

In addition to or instead of using auxiliaries capable of binding residual water, the invention also provides for after-treatment of the partly dried granules initially obtained. The aftertreatment may be carried out by two methods which may even be combined with one another.

The first of these methods is based on the fact that the individual degree of drying of the particular particle in question is determined by its particle size. If, in accordance with the invention, the drying process is terminated at a time when considerable quantities of residual moisture are still present in the material, integral consideration of the residual moisture content does only partial justice to reality. By differential consideration of the distribution of this residual moisture over the individual fractions of material, it has been found that the fine or ultrafine fractions can be dried very extensively or completely while the coarser fractions are still so moist that the material removed from the fluidized bed is not guaranteed long-term pourability and free flow. In one important embodiment of the process according to the invention, therefore, "after-drying" of the primary material from the fluidized bed is achieved by an additional, at least single-stage aftertreatment step which—without exposing the powder-form material to the risk of developing tackiness—leads to homogenization of the moisture content over the material as a whole irrespective of the individual particle size. In this way, so much residual moisture can be introduced into the fine and ultrafine material from the still comparatively moist coarse particles of the material that, after this homogenization step, the long-term pourability and free flow of the dried material are guaranteed without further quantities of moisture having to be additionally eliminated from the bulk material.

This aftertreatment step may be carried out by any method which equalizes the moisture content of the individual particles and, at the same time, prevents them from adhering to one another. Circulation, mixing or shaking of the material initially obtained either continuously or discontinuously are mentioned as examples of such methods. Aftertreatment of the material in another following fluidized bed can be particularly suitable.

Any gases, preferably ambient air, may be used for this purpose. Damage to the material by oxidation and unwanted contamination of the waste air is minimal or non-existent and is easy to control. Since the material to be dried is removed from the fluidized bed at elevated temperature, typically of the order of 105° C., a further slight reduction in the residual moisture content can be obtained by this subsequent homogenization of moisture in a fluidized bed.

However, in addition to or instead of this auxiliary measure, provision can also be made in the process according to the invention for a further reduction in the residual moisture content by additional drying in one or more stages. The after-drying treatment is characterized in that it is carried out under conditions which do not damage the useful materials in the material to be dried. Examples of process parameters for reducing risk include reducing the temperature of the hot gas phase, dispensing with superheated steam as the hot gas and replacing it with drying gases of different origin, for example air and/or inert gas, and changing over to another drying technology.

The process of fluidized-bed spray granulation is based on the growth of nuclei which are either formed in the fluidized bed itself by non-colliding, solidifying spray droplets or are produced through abrasion of solid particles already present or which are delivered to the fluidized bed from outside. If the process is to be carried out continuously, uniform granulation conditions must prevail. All the granules removed from the fluidized bed have to be replaced by an equivalent number of new nuclei. On the other hand, the waste gas has to be freed from fine particles of material entrained therein. However, these fine particles are also nuclei. In order, therefore, to ensure equalization of the above-mentioned particle balance in a particularly simple and economic manner, the fine particles of material escaping from the fluidized bed with the waste gas are separated and returned to the fluidized bed as nuclei for the formation of granules more particularly internally by means of a dust filter arranged over the fluidized bed. The fine particles may be separated from the waste gas in cyclones. In one advantageous embodiment, however, the waste gas is cleaned by means of cloth filters integrated in the head of the granulator and arranged above the fluidized bed. This is a space-saving solution because the waste gases have to be cleaned in any event and the fine particles returned to the fluidized bed.

To ensure that only granules of the required size are removed from the fluidized bed, another embodiment of the invention is characterized in that the granules are discharged from the fluidized bed through one or more classifiers. These classifiers are advantageously arranged in the feed section of the fluidized bed to save space. Countercurrent gravity classifiers are particularly advantageous.

Aqueous preparations of useful materials and combinations thereof from the field of wetting agents, detergents and/or cleaning products which are not damaged significantly, if at all, by brief exposure to water or steam at a material temperature of 100° to 120° C. are particularly suitable for use in the process according to the invention. Components of this type which are not damaged by exposure to temperatures in the range mentioned for at least about 5 s to 5 mins. under the working conditions are particularly suitable useful materials. It is crucial that the period of exposure to temperatures in this range is kept so short in the process according to the invention that substantial damage to the material to be dried does not occur under the working conditions selected. For example, even surfactant compounds which are basically vulnerable to hydrolysis are largely undamaged by exposure to these working conditions for a few seconds to a few minutes providing certain boundary conditions known to the relevant expert are observed. Thus, aqueous preparations of water-soluble and/or insoluble organic and/or inorganic useful materials from wetting agents, detergents and/or cleaning products which may be assigned, for example, to the following classes may be subjected to drying in the drying process according to the invention: surfactant or emulsifier components, inorganic and/or organic builders or builder components, washing alkalis, fillers or neutral salts, fabric softeners, bleach activators, auxiliaries for improving the soil suspending power of the liquors, such as redeposition inhibitors or even abrasives.

In one important embodiment, the process according to the invention is used to dry mixtures of useful materials for the production of laundry detergents. The aqueous starting materials to be dried contain washing-active surfactants together with builders and, optionally, washing alkalis and/or neutral salts. At least part of the multi-component mixtures used is capable of binding and/or fixing residual water, more particularly in the form of water of crystallization. As in the spray drying of laundry detergents, the laundry detergent component of mixtures of the type in question is generally not exposed in its entirety to fluidized-bed spray granulation. This is precluded by the extreme temperature sensitivity of peroxide-containing bleach components, such as perborate monohydrate or tetrahydrate, and corresponding other particularly temperature-sensitive components. Enzymes, fragrances, bleach activators and other minor components are mentioned as further examples. Accordingly, the teaching of the present invention also provides inter alia for the production of so-called multicomponent tower powders which contain a large part of the components making up the final detergent in admixture with one another, but which are subsequently treated or mixed with other, liquid and/or solid active components. Known examples of such liquid components are, in particular, readily volatile nonionic surfactant components which, although no longer discharged into the environment with the waste gas in the process according to the invention, can nevertheless readily be added to the detergent as a whole by subsequent spraying onto absorbent granules which have been prepared in accordance with the invention.

General particulars of useful materials for direct or indirect use in the production of wetting agents, detergents and/or cleaning products using the principles according to the invention are given in the following with reference to typical components of modern laundry detergents.

Suitable anionic surfactants are, for example, soaps of natural or synthetic, preferably saturated, fatty acids. Soap mixtures derived from natural fatty acids, for example coconut oil fatty acid, palm kernel oil fatty acid or tallow fatty acid, are particularly suitable. Soap mixtures of 50 to 100% saturated $C_{12-18}$ fatty acid soaps and 0 to 50% oleic acid soap are preferred.

Other suitable synthetic anionic surfactants are those of the sulfonate and sulfate type. The process according to the invention can have particular significance for corresponding compounds of vegetable and/or animal origin.

Suitable surfactants of the sulfonate type are alkylbenzene sulfonates ($C_{9-5}$ alkyl), olefin sulfonates, i.e. mixtures of alkene and hydroxyalkane sulfonates, and sulfonates of the type obtained, for example, from $C_{12-18}$ monoolefins with a terminal or internal double bond by sulfonation with gaseous sulfur trioxide and subsequent alkaline or acidic hydrolysis of the sulfonation products. Also suitable are the alkane sulfonates obtainable from $C_{12-18}$ alkanes by sulfochlorination or sulfoxidation and subsequent hydrolysis or neutralization or by addition of bisulfites onto olefins and, more particularly, the esters of α-sulfofatty acids (ester sulfonates), for example the α-sulfonated methyl esters of hydrogenated coconut oil, palm kernel oil or tallow fatty acids.

Other important surfactant and emulsifier components in this regard are the so-called disalts which may be obtained by saponification of the above-mentioned α-sulfonated fatty acid methyl esters or by direct sulfonation of fatty acids, more particularly saturated $C_{12-18}$ fatty acids.

Suitable surfactants of the sulfate type are the sulfuric acid monoesters of primary alcohols of natural and synthetic origin, i.e. of fatty alcohols, for example coconut oil fatty alcohols, tallow fatty alcohols, oleyl alcohol, lauryl, myristyl, palmityl or stearyl alcohol, or the $C_{10-20}$ oxo alcohols and those of secondary alcohols having the same chain length. Sulfuric acid monoesters of the alcohols of natural and/or synthetic origin ethoxylated in particular with 1 to 6 moles ethylene oxide are also suitable components. Such compounds as 2-methyl-branched $C_{9-11}$ alcohols containing on average 3.5 moles ethylene oxide are mentioned as an example of synthetic alcohols. Sulfated fatty acid monoglycerides are also suitable.

The anionic surfactants may be present in the form of their sodium, potassium and ammonium salts and also as soluble salts of organic bases.

Suitable nonionic surfactants are adducts of 1 to 40 moles and preferably 2 to 20 moles ethylene oxide with 1 mole of an aliphatic compound essentially containing 10 to 20 carbon atoms from the group consisting of alcohols, carboxylic acids, fatty amines, carboxylic acid amides or alkane sulfonamides. Of particular importance are the adducts of 8 to 20 moles ethylene oxide with primary alcohols, for example with coconut oil or tallow fatty alcohols, with oleyl alcohol, with oxo alcohols or with secondary alcohols containing 8 to 18 and preferably 12 to 18 carbon atoms. In addition to the water-soluble nonionics, however, water-insoluble or substantially water-insoluble polyglycol ethers containing 2 to 7 ethylene glycol ether units in the molecule are also of interest, particularly when they are used together with water-soluble nonionic or anionic surfactants. In the process according to the invention, the tendency of nonionic surfactants such as these to be carried over can be taken into consideration by completely or partly applying components of this type to the granules obtained after fluidized-bed spray granulation. The same also applies in particular to nonionic surfactants liquid at room temperature.

Other suitable nonionic surfactants are alkyl glycosides corresponding to the general formula $R-O-(G)_x$, in which R is a primary linear or branched aliphatic radical containing 8 to 22 and preferably 12 to 18 carbon atoms, G stands for a glycose unit containing 5 or 6 carbon atoms and the degree of oligomerization x is between 1 and 10.

Suitable organic and inorganic builders are soluble and/or insoluble components showing a mildly acidic, neutral or alkaline reaction which are capable of precipitating or complexing calcium ions. Suitable and, in particular, ecologically safe builders are finely crystalline synthetic zeolites of the type already mentioned. Other builder components which, in particular, may be used together with the zeolites include (co)polymeric polycarboxylates, such as polyacrylates, polymethacrylates and, in particular, copolymers of acrylic acid with maleic acid, preferably those with 50% to 10% maleic acid. The molecular weight of the homopolymers is generally in the range from 1,000 to 100,000 while the molecular weight of the copolymers is in the range from 2,000 to 200,000 and preferably in the range from 50,000 to 120,000, based on free acid. A particularly preferred acrylic acid/maleic acid copolymer has a molecular weight of 50,000 to 100,000. Suitable, but less preferred compounds of this class are copolymers of acrylic acid or methacrylic acid with vinyl ethers, such as vinyl methyl ether, in which the acid makes up at least 50%. Other suitable builders are polyacetal carboxylic acids, for example of the type described in U.S. Pat. Nos. 4,144,226 and 4,146,495, and also polymeric acids which are obtained by polymerization of acrolein and subsequent disproportionation with alkalis and which are made up of acrylic acid units and vinyl alcohol units or acrolein units.

Suitable organic builders are, for example, polycarboxylic acids which are preferably used in the form of their sodium salts, such as citric acid and nitrilotriacetate (NTA), providing there are no ecological objections to their use.

In cases where a phosphate content can be tolerated, it is also possible to use phosphates, more particularly pentasodium triphosphate, and even pyrophosphates and orthophosphates which act primarily as precipitants for lime salts.

Suitable inorganic non-complexing salts are the bicarbonates, carbonates, borates or silicates of the alkali metals which are also known as "washing alkalis". Of the alkali metal silicates, sodium silicates with an $Na_2O$ to $SiO_2$ ratio of 1:1 to 1:3.5 are particularly suitable. From the remaining groups of typical detergent ingredients, components from the classes of redeposition inhibitors (soil suspending agents), neutral salts and fabric softeners are particularly suitable for use in the process according to the invention.

Suitable redeposition inhibitors are, for example, carboxymethyl cellulose, methyl cellulose, methyl hydroxyethyl cellulose and mixtures thereof. The above-mentioned sodium sulfate is cited as a typical example of a suitable representative of the neutral salts. Suitable softeners are, for example, swellable layer silicates of the montmorillonite type, for example bentonite.

As mentioned above, typical ingredients of detergents and cleaning preparations sensitive to high temperatures, such as bleaches based on per compounds, enzymes from the class of proteases, lipases and amylases, or bacterial strains or fungi, stabilizers, fragrances, temperature-sensitive dyes and the like, are best mixed with the granules obtained beforehand.

Examples and test results of the process according to the invention are described in detail in the following.

Figure 1:
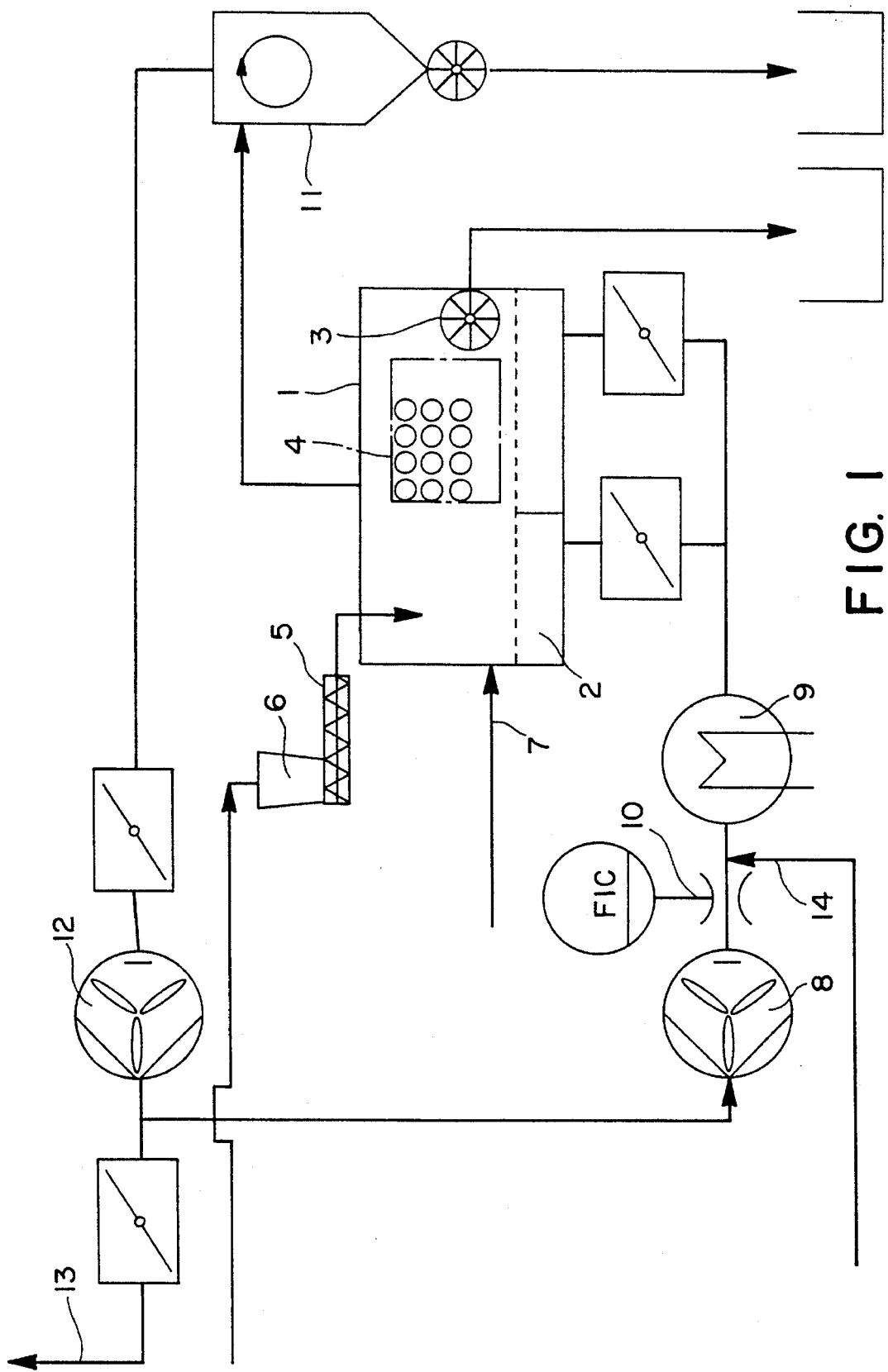
FIG. 1 diagrammatically illustrates the test installation. It consists essentially of a fluidizing chamber 1 comprising a split, separately feedable slotted diffusor 2, a star wheel 3 for the removal of product and a tube-bundle heat exchanger 4 which is integrated in the fluidizing chamber 1 and which is installed above the slotted diffusor 2. A screw conveyor 5 with a feed hopper 6 is used to return oversize material after grinding. The material to be dried, i.e. the slurry, is pumped from a heated tank to a one-component nozzle through the pipe 7 and sprayed into the fluidized bed.

A blower 8 transports steam through a heat exchanger 9 used for reheating (superheating) into the fluidizing chamber 1. A throughflow meter and controller 10 is arranged between the blower 8 and the heat exchanger 9. The issuing steam is freed from dust in a cyclone 11 and is returned by another fan 12. The excess vapors are removed from the circuit at 13. A connection 14 to the steam circulation pipe is provided for starting the test.

At the beginning of the test, so-called "tower powder" was introduced as the bed material. It had been produced by conventional drying with hot air in a production spray drying tower (apparent density 550 g/l, residual moisture approx. 12%). The tower powder contained approx. 16% by weight surfactants, approx. 15% by weight soda and 28% zeolite NaA, approx. 2% waterglass, Sokalan®, and typical minor components.

After the bed material had been fluidized with hot air, the detergent slurry was sprayed in (approx. 30 kg/h at 6 bar spraying pressure) through the one-component nozzle (bore diameter 0.7 mm). The solids component of the slurry contained the constituents mentioned above.

The initial moisture content of the slurry was 50%. The moist waste air was partly removed from the circuit, but largely circulated, the circulated air stream being reheated in the heat exchanger 9 before the fluidized bed. The air stream removed from the circuit was replaced by fresh air. The temperature of the air on entering the fluidized bed was approximately 145° C.; its exit temperature was approximately 90° C.

Some of the granules produced were removed from the fluidized bed by the star wheel 3, ground up and returned to the fluidized bed by the screw conveyor 5 as granulation nuclei. The residence time of the product in the fluidized bed was approximately 20 minutes.

When no further increase in apparent density was observed after several hours, the system was switched to drying with superheated steam. The steam was circulated in the same way as the air. The steam was again superheated by the heat exchanger 9 before the fluidized bed and the tube-bundle heat exchanger 4 arranged therein. The average steam entry temperature was 150° C., the temperature of the steam on leaving the fluidized bed being 105° C. The throughput of slurry was 30 kg/h. The granules produced in the previous tests based on drying with air were used as the bed material at the beginning of the steam drying phase. The residence time of the product in the fluidized bed was approximately 20 minutes.

The test results are set out in Tables 1 and 2.

Table 1 shows the apparent densities of three samples taken from the fluidized bed:

sample 3 at the end of the tests with air drying

Sample 6 after drying with steam and 1x bed exchange

Sample 7 after drying with steam and 2x bed exchanges

TABLE 1

| Sample | 3 | 6 | 7 |
| --- | --- | --- | --- |
| Recycle gas | Air | Steam | Steam |
| Gas entry temperature (°C.) | 140 | 150 | 152 |
| Gas exit temperature (°C.) | 100 | 108 | 108 |
| Gas throughput (operating m³/h) | 635 | 940 | 945 |
| Product throughput (kg/h) | 30 | 30 | 30 |
| DM in (% by weight) | 50 | 50 | 50 |
| DM out (% by weight) | 94.3 | 94.9 | 94.3 |
| Apparent density (g/l) | 687 | 780 | 820 |

DM = Dry matter content

As can be seen, there is a distinct increase in the apparent density from 687 g/l in the case of sample 3 to 782 g/l in the case of sample 6 and finally to 820 g/l in the case of sample 7. In every case, the residual moisture content was approx. 5% (as measured by infrared drying for 7 mins. at 135° C.).

The sieve analyses (Table 2) indicate a shift towards larger particles in the steam drying phase.

Photographs taken with an optical microscope show that the air-dried particles have a much smoother and more uniform surface than the steam-dried particles. At the same time, photographs of the particle interior show that the air-dried granules have fewer and smaller pores than the steam-dried granules. This results in considerably better solubility of the steam-dried particles.

There was no sign of any caking on the heat exchanger 4 in the fluidized bed or of product damage through direct contact with the heat exchanger tubes.

TABLE 2

| | Sieve analysis | | |
| --- | --- | --- | --- |
| Sample | 3 | 6 | 7 |
| Larger than 1.6 mm | 9.8 | 46.5 | 31.4 |
| Larger than 0.8 mm | 46.9 | 43.3 | 56.7 |
| Larger than 0.4 mm | 27.6 | 8.3 | 10.9 |
| Larger than 0.2 mm | 8.9 | 1.3 | 0.8 |
| Larger than 0.1 mm | 3.4 | 0.5 | 0.3 |
| 0.1 mm or smaller | 3.5 | 0.2 | 0.2 |

List of reference numerals

1 Fluidizing chamber
2 Slotted diffusor (diffusor)
3 Star wheel
4 Heat exchanger
5 Screw conveyor
6 Feed hopper
7 Pipe
8 Blower
9 Heat exchanger
10 Throughflow meter and controller
11 Cyclone
12 Fan
13 Excess vapors
14 Connection

We claim:

1. A process for the production of pourable, free-flowing granules which are suitable for use as wetting agents, detergents or cleaning products from aqueous solutions or suspensions of such materials in a fluidized-bed spray granulation apparatus employing a hot fluidizing gas, comprising drying said aqueous solutions or suspensions with superheated steam as the fluidizing and drying gas, said drying step being carried out in a closed-loop system comprising a steam circuit from which water evaporated from said aqueous solutions or suspensions of starting materials is removed as a partial stream and thermal energy released is returned to said steam circuit, and discharging the granules from the granulation apparatus before they can be damaged by heat.

2. The process as in claim 1 including adding to said granules a mixture component capable of binding limited quantities of water to assure long-term pourability and flowability of said granules.

3. The process as in claim 2 wherein said mixture component is at least partly incorporated in said aqueous solutions or suspensions before said drying step.

4. The process as in claim 3 wherein said mixture component is selected from the group consisting of builders, washing alkalis and fillers.

5. The process as in claim 1 including post-treating said granules to assure long-term pourability and flowability of said granules.

6. The process as in claim 1 wherein thermal energy is introduced into the superheated steam through heat exchangers integrated in said fluidized bed apparatus or through external heat exchangers.

7. The process as in claim 6 wherein in the drying of materials particularly sensitive to heat, introducing thermal energy into said superheated steam solely through external heat exchangers, the residence time of said materials being shorter than in the case of heat exchangers integrated into said fluidized bed apparatus.

8. The process as in claim 6 wherein the thermal energy introduced through heat exchangers integrated in said fluidized bed apparatus has an entry temperature in the range from 150° C. to 180° C.

9. The process as in claim 1 wherein the stream removed from said steam circuit is freed from particles of the starting materials entrained therein and used as recycle steam.

10. The process as in claim 1 wherein at least part of the stream removed from the steam circuit is condensed and is reused together with the starting materials present therein for preparing said aqueous solutions or suspensions to be dried.

11. The process as in claim 1 wherein said steam circuit is operated under such pressures that air is unable to penetrate into said steam circuit.

12. The process as in claim 1 wherein said drying step with superheated steam is terminated at residual water contents in the range from about 1 to 20% by weight, based on the weight of the granules discharged from said fluidized bed spray granulation apparatus.

13. The process as in claim 1 wherein steam having an entry temperature of about 270° C. to 350° C. is used as the fluidizing gas for said fluidized bed apparatus.

14. The process as in claim 1 carried out with at least partial recovery of the heat of condensation of the stream removed from said steam circuit.

15. The process as in claim 1 wherein the residual moisture content of said granules obtained is homogenized in an at least one-stage post-treatment step.

16. The process as in claim 1 wherein residual moisture content of said granules is homogenized in another fluidized bed with air as a fluidizing gas.

17. The process as in claim 1 wherein granules still containing residual water are agglomerated and post-dried or post-treated under conditions which do not adversely affect the granules.

18. The process as in claim 1 wherein fine particles escaping from said fluidized bed apparatus with waste gas are collected and returned to the fluidized bed apparatus as nuclei for granule formation.

19. The process as in claim 18 wherein the waste gas is cleaned by cloth filters integrated in a head of said granulation apparatus and arranged above the fluidized bed.

20. The process as in claim 1 including discharging said granules from said fluidized bed apparatus through one or more classifiers.

21. The process as in claim 1 wherein said aqueous preparations of said materials comprise materials which are not damaged by brief exposure to water and steam at temperatures of 100° to 120° C. for at least 5 seconds to 5 minutes.

22. The process as in claim 21 wherein said materials comprise aqueous preparations of water-soluble or insoluble organic or inorganic materials selected from the group consisting of surfactants, emulsifiers, builders, washing alkalis, fillers, neutral salts, fabric softeners, bleach activators, redeposition inhibitors and abrasives.

23. The process as in claim 22 wherein said granules comprise individual components of organic or inorganic materials selected from the group consisting of surfactants, emulsifiers and builders.

24. The process as in claim 22 wherein said granules comprise mixtures of said materials useful for the production of laundry detergents containing surfactants, builders, washing alkalis and neutral salts, and at least part of the multicomponent mixtures are capable of binding or fixing residual water.

25. The process as in claim 1 wherein said granules comprise anionic surfactants based on natural materials in admixture with soluble inorganic salts to ensure free flow and pourability of said granules.

26. The process as in claim 1 wherein said granules comprise silicate-based materials which may be used in laundry detergents and which comprise swellable or non-swellable materials selected from the group consisting of layer silicates and zeolite compounds.

27. The process as in claim 1 including mixing said granules with temperature-sensitive or steam-volatile components to produce a laundry detergent composition.

* * * * *